United States Patent
Null

[19]

[11] Patent Number: 5,819,886
[45] Date of Patent: Oct. 13, 1998

[54] TRAILER BRAKE SYSTEM WITH DUAL PISTON CALIPERS

[76] Inventor: Robert L. Null, 2868 State Rt. 378, Willow Wood, Ohio 45696

[21] Appl. No.: 675,030

[22] Filed: Jul. 3, 1996

[51] Int. Cl.⁶ ........................................................ B60T 7/20
[52] U.S. Cl. ........................................ 188/73.41; 188/72.5
[58] Field of Search .............................. 188/73.41, 73.42, 188/72.4, 72.5, 369, 370

[56] References Cited

U.S. PATENT DOCUMENTS

| | | | |
|---|---|---|---|
| 2,746,575 | 5/1956 | Kinchin | 188/72.5 |
| 3,113,643 | 12/1963 | Botterhill | 188/72.5 |
| 3,156,325 | 11/1964 | Taylor | 188/72.5 |
| 3,285,372 | 11/1966 | Rossmann | 188/72.5 |
| 3,478,844 | 11/1969 | Beuchle . | |
| 3,729,069 | 4/1973 | Klein et al. . | |
| 3,746,132 | 7/1973 | Jewell, Jr. . | |
| 4,093,043 | 6/1978 | Smith . | |
| 4,187,931 | 2/1980 | Balzer . | |
| 4,716,994 | 1/1988 | Iwamoto | 188/72.2 |
| 4,754,856 | 7/1988 | Villata . | |
| 5,316,110 | 5/1994 | Null | 188/73.43 |
| 5,411,120 | 5/1995 | Null | 188/73.43 |
| 5,551,538 | 9/1996 | Null | 188/73.43 |
| 5,622,241 | 4/1997 | Null | 188/73.43 |

FOREIGN PATENT DOCUMENTS

92/17449.3  2/1993  Germany .

Primary Examiner—Matthew C. Graham
Attorney, Agent, or Firm—King and Schickli

[57] ABSTRACT

A trailer brake system provides an improved disc brake assembly with a caliper unit having first and second housings which contain hydraulically operated opposed pistons for engaging brake pads and providing relative movement toward and away from a brake rotor. The caliper unit is pivotally mounted to the stationary mounting bracket to allow for movement for opening a relief valve and release of the hydraulic pressure and firm braking engagement of the brake pads during the backing, non-braking mode. The dual piston arrangement provides for self-centering/self adjustment of the brake pads without the need for in and out axial movement of the caliper unit. The first and second housings also include internal passageways passing therebetween for delivering a high pressure hydraulic fluid to the first and second cylinders, the fluid providing simultaneous actuation of the opposed pistons. An opening is provided in the top of the caliper unit for accessing the brake pads. The brake pads may be visually inspected, installed and removed through the opening, and heat is allowed to dissipate from the brake pads through the opening during operation. One end of the stationary mounting bracket is left open so that it may be placed over the axle of the trailer and installed without the need for removing the entire hub assembly. A leaf spring is provided for biasing the caliper unit to hold the relief valve closed wards a forward position during forward movement of the trailer in readiness for brake operation.

14 Claims, 5 Drawing Sheets

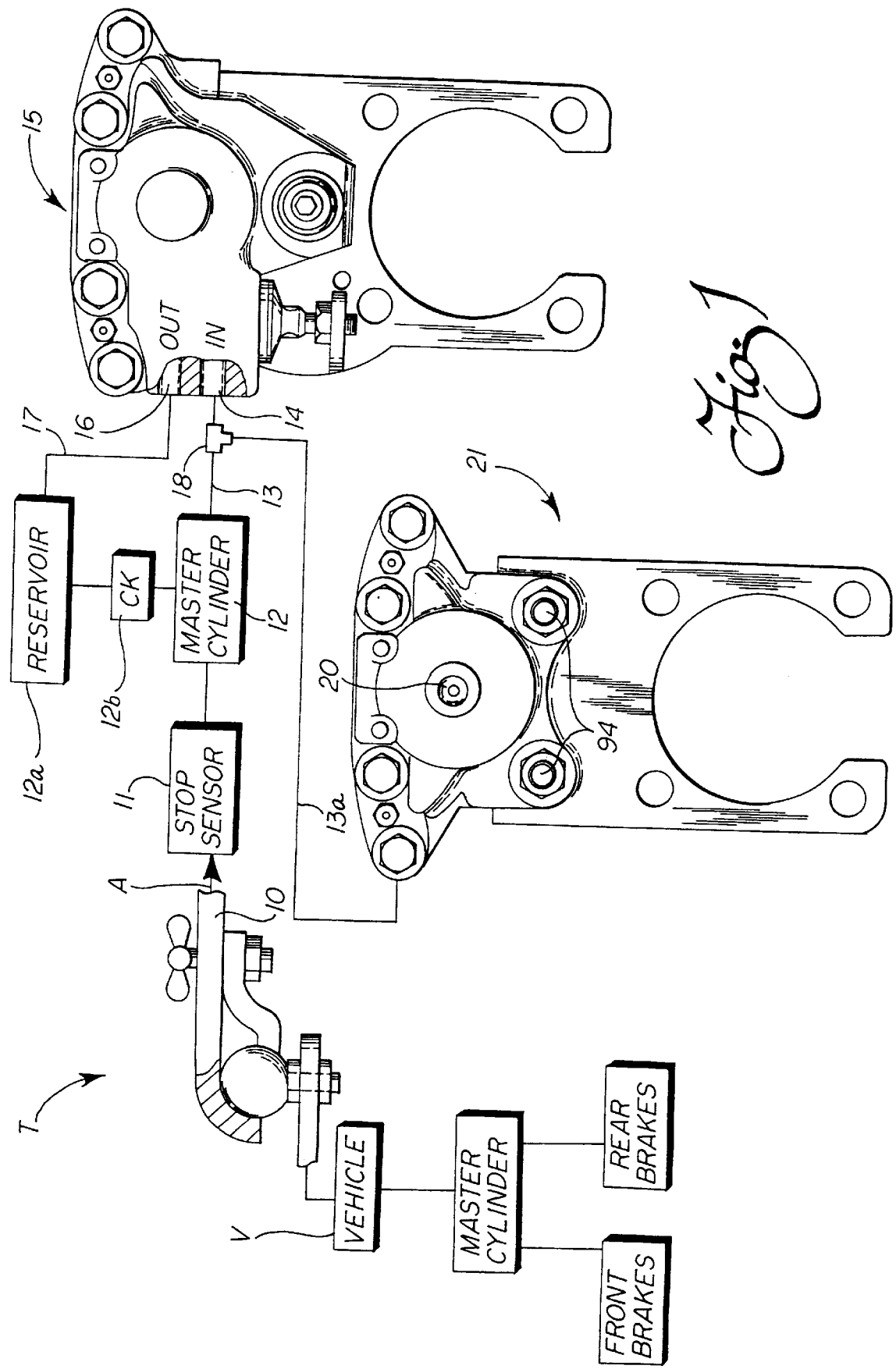

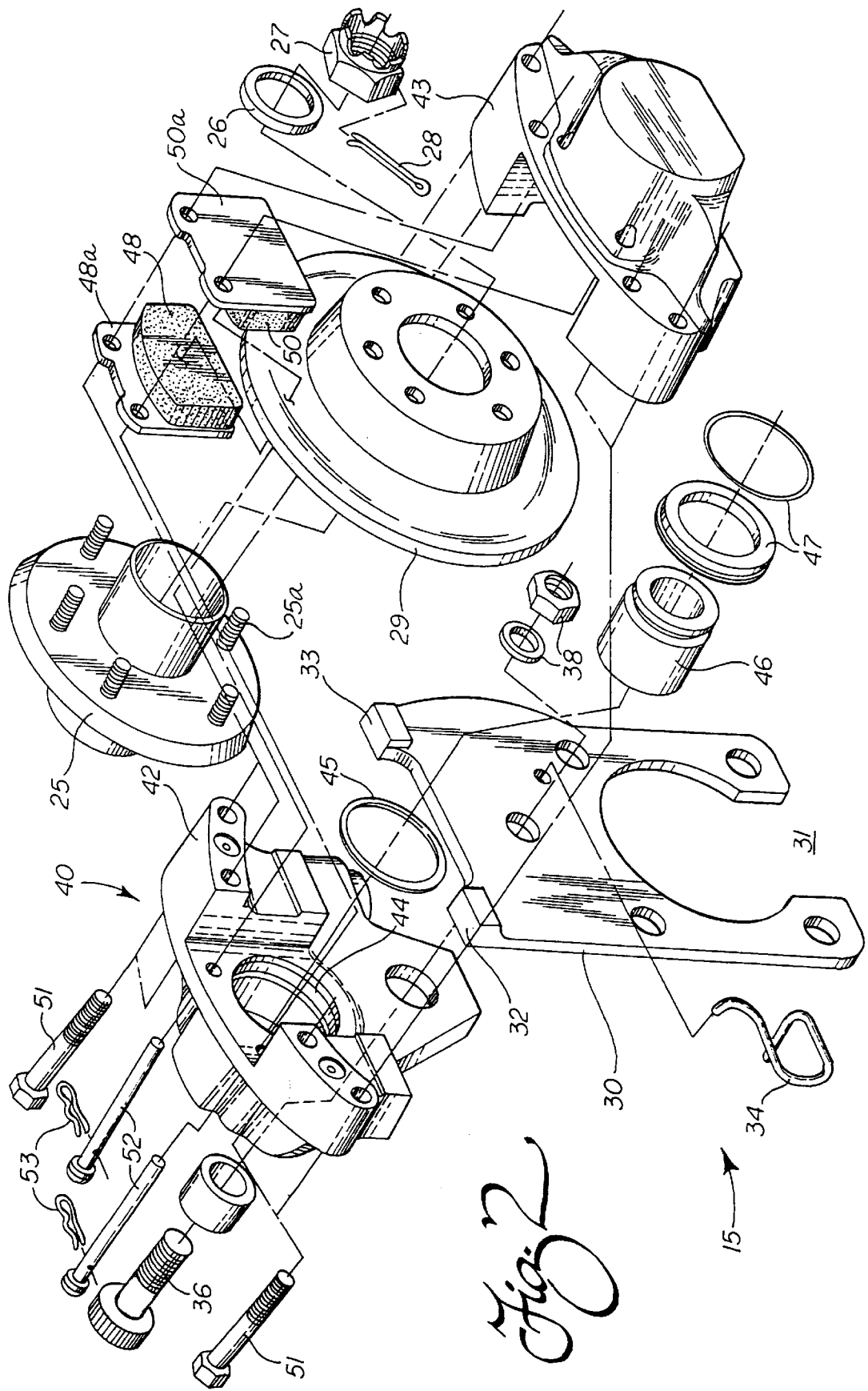

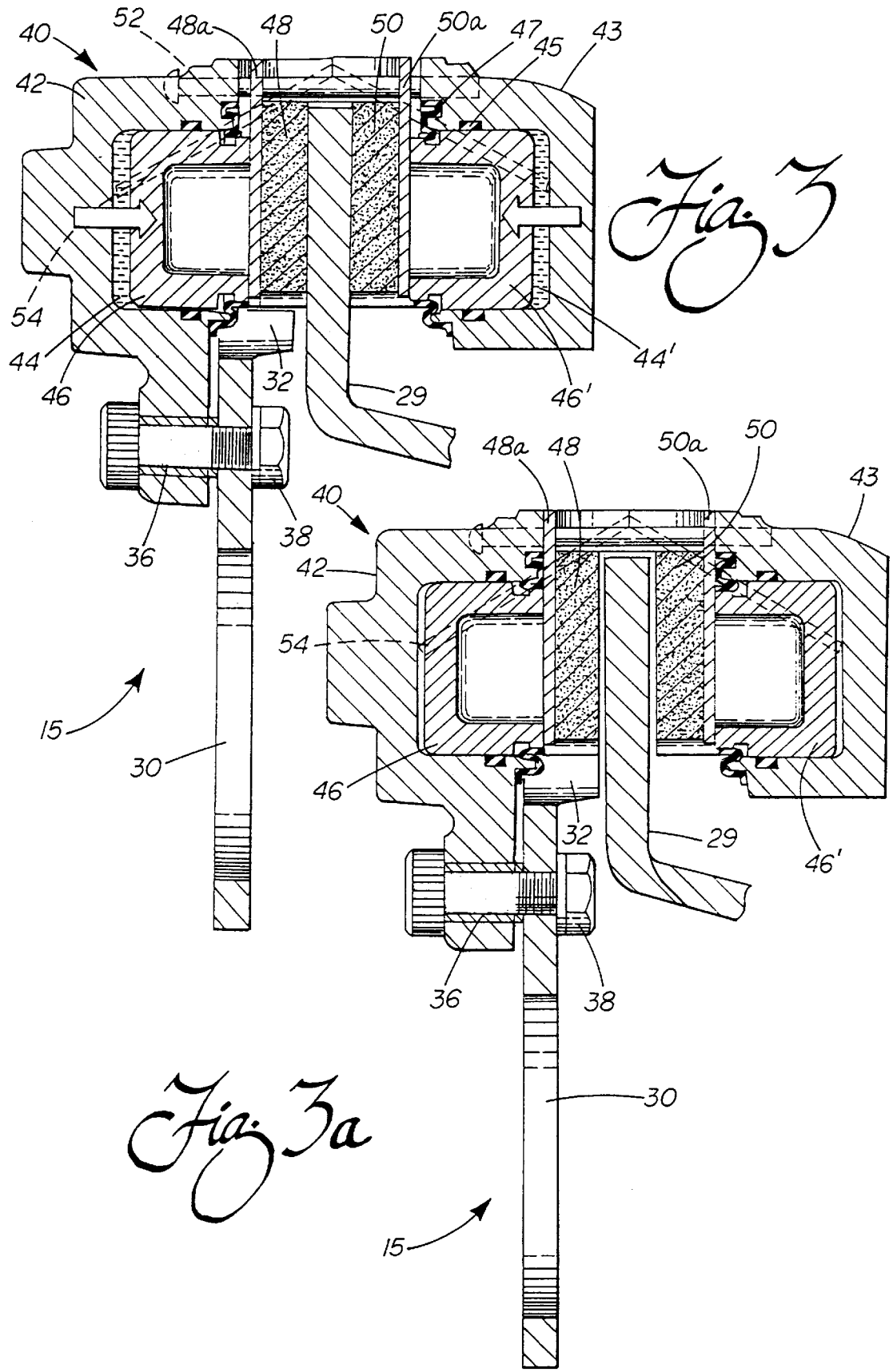

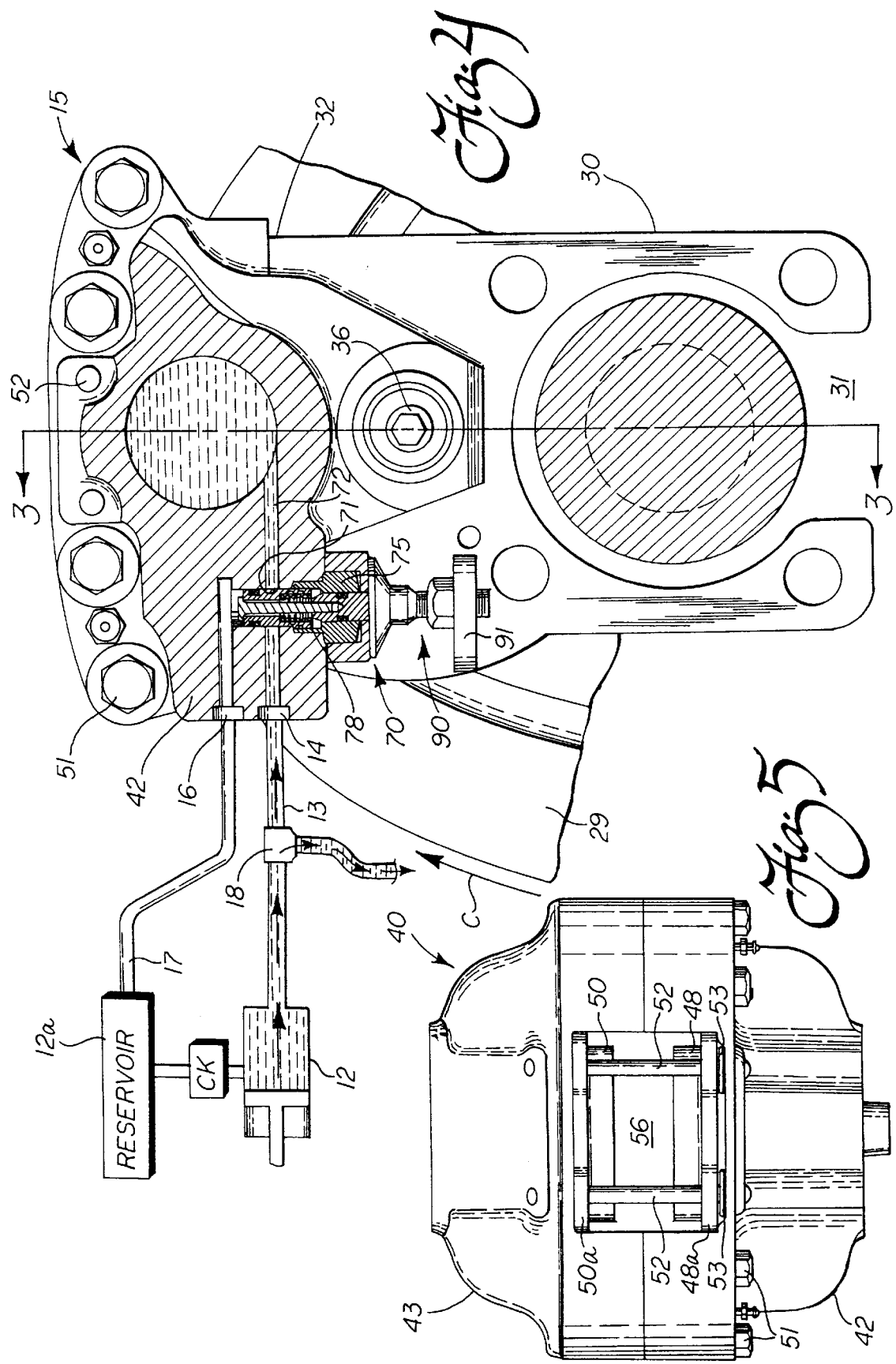

though these patents and pending patent application are experiencing widespread and successful commercial use. These braking systems have proven through extensive testing and commercial use to be highly efficient and very reliable in performance. Users have found that the performance increase in this disc brake system is outstanding. As a consequence, stopping distances are significantly reduced with the Null's brake system so as to meet and exceed all federal and local requirements.

TRAILER BRAKE SYSTEM WITH DUAL PISTON CALIPERS

TECHNICAL FIELD

The present invention relates generally to disc brake systems for a trailer or other towed vehicle; and, more particularly, to an improved brake unit including a disc brake assembly having an opposed dual piston arrangement for providing efficient braking during forward movement and automatic release upon backing.

BACKGROUND OF THE INVENTION

Numerous braking systems have been proposed for applying braking action to the wheels of a towed vehicle, such as a trailer. While utilizing many of the same concepts which have been successful for standard braking systems on automobiles, the trailer braking systems are different in that the manner of activation and release are not the same. Over the years, many technical advances have been made for automotive braking systems, yet until just recently very little change has been made in trailer braking systems. With highway traffic safety regulations becoming increasingly more stringent, improved braking for trailers is an absolute necessity. A successful trailer braking system that has recently brought about great changes and has set the standard for future trailer brake systems is illustrated in my prior U.S. Patents entitled "Trailer Brake System With Release Apparatus", U.S. Pat. Nos. 5,316,110 and 5,411,120, issued on May 31, 1994 and May 2, 1995, respectively, and my pending U.S. patent application Ser. No. 08/527,244, filed Sep. 12, 1995, and entitled "Trailer Brake System With Multiple Point Caliper Unit Mounting" now U.S. Pat. No. 5,622,241.

Today, Null's free backing disc brake systems represented by these patents and pending patent application are experiencing widespread and successful commercial use. These braking systems have proven through extensive testing and commercial use to be highly efficient and very reliable in performance. Users have found that the performance increase in this disc brake system is outstanding. As a consequence, stopping distances are significantly reduced with the Null's brake system so as to meet and exceed all federal and local requirements.

Still, while the basic Null's brake system has been very successful, further improvements are desirable for a more compact design, as well as increasing performance, versatility and reliability. In addition, it is also desirable to maintain the overall cost of manufacturing and maintenance very low compared to previous systems. One way of achieving these results, as set forth by my present invention, would be to develop a brake system which includes individual brake units having hydraulically operated pistons positioned on opposite sides of a brake rotor, with an equal force being applied to the rotor through brake pads as a result of the dual piston action.

While the broad concept of using an opposed dual piston arrangement in a braking system is generally known, I am aware of no effective such arrangement for use on a trailer braking system. Furthermore, dual piston braking systems typically include a fixed caliper unit, i.e. no pivoting, which provides efficient braking during forward movement, but is unable to provide the automatic release upon backing which is needed for a trailer braking system such as disclosed in my previous designs.

For example, U.S. Pat. No. 3,478,844 to Beuchle teaches the use of a disc brake assembly using hydraulically operated pistons for applying pressure on opposite sides of a brake rotor. The caliper unit is integrally formed with the steering system of the vehicle and thus, must be maintained in a fixed position. This type of system would be expensive to produce due to its integral formation with the steering system, and would be difficult for the user to install and maintain. Furthermore, the Beuchle brake assembly provides for the outer portion of the caliper unit being mounted to the inner portion by a bolt(s), in cantilever type form, with the brake pads being supported by the same bolt(s). This requires that a portion of the brake caliper be disassembled, and hydraulic lines be disconnected as well in order to replace worn brake pads.

In contrast to a fixed caliper type braking system, U.S. Pat. No. 3,746,132 to Jewell discloses a disc brake back-up release system having dual caliper cylinders. While this brake assembly is not fixed in one position, the sliding, translational movement which is provided for has been generally found to be unreliable. This is due in part to the reliance on the slotted mounts to provide relative movement for activation of the release valve unit and the unstable mounting of the valve unit. Build-up of road dirt and debris between the moving surfaces and in the open slots has proven to contribute to inefficient operation.

Accordingly, a need is therefore identified for an improved disc brake assembly having an opposed piston/cylinder arrangement which is capable of effectively being used with a trailer braking system that provides for automatic release from braking upon backing.

SUMMARY OF THE INVENTION

It is accordingly a primary object of the present invention to further extend the basic concept of my prior disc brake systems so as to provide an improved, compact disc brake assembly having increased braking performance, versatility and reliability, while at the same time producing an affordable trailer braking system which is compatible with consumers' needs.

It is another important object of the present invention to provide a disc brake system for a trailer wherein a hydraulically operated dual piston arrangement is used to provide efficient braking during forward movement and automatic, reliable release upon backing.

It is another object of the present invention to provide a disc brake system for a trailer wherein the housing assembly of the caliper unit contains opposed pistons which are in operative engagement with brake pads for applying equal and opposite centering forces across a brake rotor during the braking mode, and an independent pivot mounting for the caliper unit as it moves in response to rotor movement during the backing, non-braking mode.

It is still another object of the present invention to provide a disc brake assembly for a braking system for a trailer where the brake unit may be installed without removing the hub assembly, and the brake pads may be accessed for installation, removal and visual inspection without disassembling the entire caliper unit.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a braking system including a disc brake assembly for a trailer or other towed vehicle is provided that incorporates improvements to my prior systems, such as illustrated in the No. '110 and the No. '120 issued U.S. patents and the No. '244 pending patent application. An important improvement feature of the present invention is in providing a braking system which incorporates a dual piston/cylinder arrangement to provide a more compact design, increased braking performance, versatility and reliability, which can still be manufactured at a low cost and at the same time remain relatively simple to install and maintain for the user. Similar to my previous designs, each brake unit of the system, including the hydraulic operating means, is self-contained and performs the operation of braking in a unique manner.

The improved trailer brake system includes a stationary mounting bracket for attaching each brake unit to the axle of the vehicle. The bracket supports a caliper unit which includes a housing assembly comprised of a first housing and a second housing. The individual housings contain brake pads that are moved toward and away from the rotor attached to the wheel of the vehicle, and thus, into and out of engagement with the rotor for braking/non-braking, respectively. Similar to my previous designs, the caliper unit is pivotally mounted on the bracket for providing pivoting movement of the caliper unit in response to rotation of the rotor upon backing. Preferably, a single pin is utilized for reliably providing the pivoting movement.

As set forth above, an important aspect of the present invention includes providing a hydraulically operated dual piston/cylinder arrangement for engaging the brake pads so as to provide the relative movement for gripping the rotor and thus providing the braking action. More specifically, the pistons are placed in an opposing manner within the housing assembly. A first piston is positioned within a first brake cylinder within the first housing and likewise, a second piston is positioned within a second brake cylinder in the second housing. Thus, it should be appreciated that the pistons simultaneously engage the brake pads with equal force on opposite sides of the brake rotor.

Advantageously, the use of a dual piston arrangement results in several improvements being realized. For example, the opposed pistons provide a more compact design since for the same braking force, the pistons are smaller in diameter allowing the housing to be smaller especially in height. In addition, this arrangement also provides equal and opposite centering forces across the brake rotor. Advantageously, this eliminates the need for movement of the housing assembly along the axis of the piston, as required in my previous designs. By eliminating the need for axial movement, the movement pattern is simplified and hence, overall reliability is increased. The pivoting movement of the caliper unit required to release the braking pressure during the backing, non-braking mode of operation is allowed to more effectively operate due to the axial movement of the caliper unit being eliminated. Thus, by establishing the pivoting action independently of the braking action supplied by the dual pistons, any tendency toward binding or other stress including interaction between the parts is obviated.

Accordingly, it should be appreciated that the opposed dual piston arrangement of the present invention not only allows for more compact, efficient and reliable braking operation for trailers, but also improves the responsiveness and maintenance record of the braking system. Furthermore, the elimination of the in and out axial movement of the caliper unit in order to provide centering of the brake pads across the rotor is an essential feature of the new improved trailer braking system. Whereas in my previous designs there was a need for both the in and out axial movement and the pivoting movement in order to provide the release of the brake pads from firm braking engagement with a rotor upon backing, now only the pivoting movement is needed. Thus, it should be appreciated that both the self centering of the brake pads provided by the dual pistons and the independent pivoting movement are made more efficient and reliable while not departing from the basic patented concept.

In accordance with other aspects of the present invention, passageways are provided within the housing assembly of the caliper unit to deliver a fluid which supplies the hydraulic pressure wherein the passageways connect the first and second brake cylinders. More specifically, the fluid enters the first cylinder through an inlet port and then travels through the passageways into the second cylinder. This causes both pistons to be simultaneously actuated with equal and opposite force. Preferably, the passageways are molded internally within the housing assembly so as to eliminate any need for external feed lines on the caliper unit. This greatly simplifies the installation and maintenance of the brake assembly in that the user does not need to connect/disconnect feed lines, as well as reduces the possibility of an external feed line being damaged.

As in my previous brake system designs, a means to release the firm braking engagement of the brake pads with the rotor in response to pivoting movement during the backing, non-braking mode is provided. Preferably, the release means is a relief valve for relieving the hydraulic pressure in response to the pivoting movement. The present invention also includes a resilient means for biasing the caliper unit toward the forward position during forward movement of the trailer or other towed vehicle. However, it should be appreciated that during backing of the trailer the resilient means allows the pivoting action of the caliper unit to take place. This, in turn, allows the relief valve to provide the automatic release of the brake pads from engagement with the rotor. It should also be appreciated that since the in and out axial movement of the caliper unit is eliminated, a simple and inexpensive leaf spring may be provided to provide the biasing action, as opposed to more complex resilient means as used in my previous designs.

In accordance with yet another aspect of the present invention, an opening is provided in the top of the caliper unit through which the brake pads may be accessed. More particularly, transverse pins, which span the opening, are provided for slidably carrying backing plates upon which the brake pads are integrally formed. It should be realized that the transverse pins are only for supporting the backing plates/brake pads and that additional connecting bolts are provided in order to connect the first and second housings which form the housing assembly. Thus, it should be appreciated that the brake pads may be easily installed/removed by simply removing the transverse pins without the need for disassembling the entire caliper unit. Additionally, the opening in the top of the caliper unit allows for visual inspection of the brake pads to determine the amount of wear.

Furthermore, the sliding motion of the backing plates/brake pads upon the transverse pins allows for the pads to freely move into and out of engagement with the rotor in response to forces applied thereto by the opposed pistons. This enables the self centering action, as well as self adjustment and smooth in and out action of the brake pads during operation.

Another advantage of the opening in the caliper top is that heat generated during braking action is allowed to dissipate from the brake assembly into the surrounding atmosphere. By maintaining the brake pads at a lower temperature during operation, the life of the brake pads is extended and the overall reliability and performance of the braking system is increased.

An additional aspect of the present invention is that the stationary mounting bracket is preferably open on the end opposite from where the caliper unit is mounted thereto in order that the brake assembly may be easily installed on the vehicle. More particularly, the open ended mounting bracket allows for the brake assembly to be placed over the axle/spindle into its operating position without need for removing the entire wheel/hub assembly. Thus, it should be realized that installation of the brake assembly is greatly simplified and will result in saving time for the installer.

The brake system of the present invention also contemplates one brake assembly which incorporates the release means/relief valve to form a master brake assembly to brake one wheel of a trailer, and a slave or follower brake assembly to brake the second or additional wheels. It is preferable to include a split common feed and exhaust lines, and a common transfer line in the housing, for supplying/releasing the hydraulic pressure. Upon backing, the flow reverses in the transfer line to release the hydraulic pressure from the cylinders in both assemblies through the exhaust line. Advantageously, the relief valve includes a flow through valve chamber for the pressure side, and a reciprocal valve member in the chamber to open and close the exhaust side. A separate return transfer line from the brake cylinder is obviated. Upon lifting of the valve element in the relief valve by engagement with an adjustable actuating tab, the pressurized fluid is dumped directly from the transfer line to the common return line. At all times during braking, the cylinders of both brake assemblies are assured of being provided with operating pressure.

During the operation of the braking system of the present invention, a master cylinder on the trailer tongue translates the surge of the trailer upon braking by the towing vehicle to generate a hydraulic pressure that is fed through the common feed line through the master brake assembly. The pads engage the rotor for braking of that wheel of the trailer, usually the left front wheel. Each of the additional wheels, such as the right wheel of the trailer and both rear wheels when a tandem axle trailer is being equipped, are simultaneously braked by the slave brake assembly or assemblies.

When the towing vehicle is backed, the force along the tongue is translated into hydraulic pressure in the master cylinder, essentially the same as during normal braking. In effect, the tendency toward braking action is initiated. However, the relief valve on the master brake assembly is opened by the pivoting action against the valve actuator pad allowing the hydraulic fluid to flow back through the single transfer passage in the common exhaust line to the non-pressurized reservoir. With the pressure thus relieved, both brake assemblies are disengaged and the trailer is backed easily.

The valve element within the relief valve assembly proportions the flow to maintain the brake pads in light engagement with the rotor so that the caliper unit is held in the pivoted position until backing is complete. Advantageously, by utilizing the dual piston/cylinder arrangement for applying a braking force to the brake pads and eliminating the need for in and out axial movement of the caliper unit, the pivot pin allows for smooth uninterrupted pivoting action of the caliper unit. Thus, the combination of these features provides further assurance against intermittent operation or jerking of the trailer during the backing mode.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawings incorporated in and forming a part of the specification, illustrates several aspects of the present invention and together with the description serves to explain the principles of the invention. In the drawing:

FIG. 1 is a schematic diagram of the braking system set up in accordance with the use of the improved disc brake assemblies of the present invention, and particularly including one master disc brake assembly and one slave or follower disc brake assembly suitable for a single axle trailer;

FIG. 2 is an overall exploded view of the improved disc brake assembly of the present invention used as the master brake assembly, and illustrating the manner for mounting on a trailer hub and the relationship with the brake rotor; it being understood that the slave/follower brake assembly is preferably the same except it does not include a pressure relief valve and does not include a single pivot pin for mounting the caliper unit to the mounting bracket;

FIG. 3 is an enlarged cutaway view of the disc brake assembly of the present invention similar to FIG. 4, showing the brake pads in engagement with the disc for braking action;

FIG. 3A is a cross sectional view of the disc brake assembly taken along line $3^A$—$3^A$ A of FIG. 4A with the brake pads in their released or withdrawn position on opposite sides of the brake disc;

FIG. 4 is a front view and partially in cross section illustrating the master brake unit and the operation of the disc brake assembly during normal forward movement and braking;

FIG. 5 is a top view of a caliper unit showing the opening in the top of the caliper unit, as well as, the positioning of the brake pads within the opening.

Figure 4A:
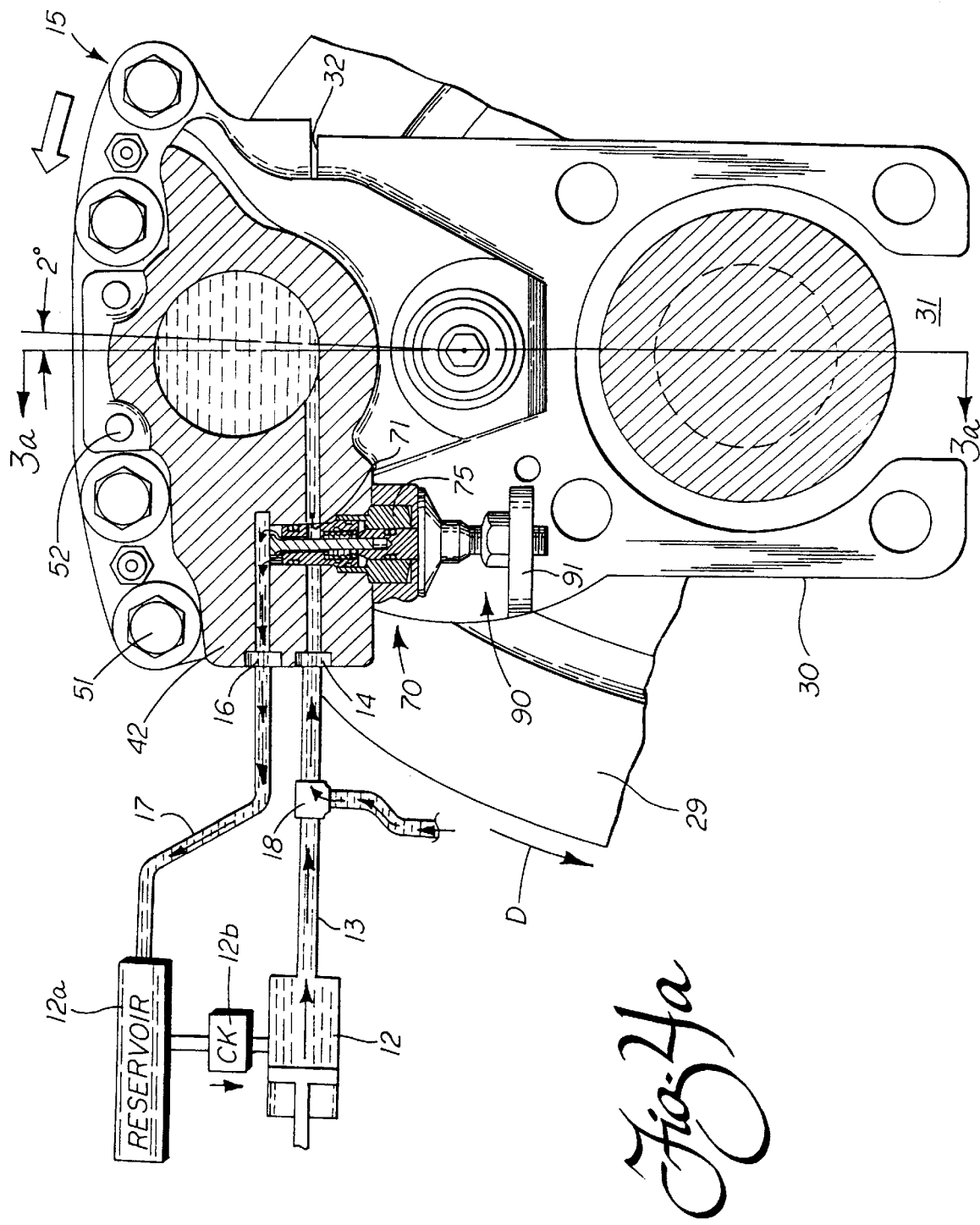
FIG. 4A is a similar view as FIG. 4, but with the caliper unit pivoted through approximately 2° for relief of the pressure during the backing, non-braking mode of operation.

Reference will now be made in detail to the present preferred embodiment of the invention, an example of which is illustrated in the accompanying drawings.

DETAILED DESCRIPTION OF THE PREFERRED EMBODIMENT

In the overall schematic view of FIG. 1, a trailer braking system is set up according to the present invention. The particular set up will be recognized as being one for a typical single axle trailer with braking being applied to both wheels. On the far left hand side of this figure, there is shown in block form a vehicle V incorporating a conventional master cylinder, front brakes and rear brakes (not numbered). On the right hand side is depicted the trailer, or other towed vehicle, T that may be connected by a conventional ball type hitch H to the towing vehicle V.

As schematically shown in FIG. 1, the trailer T includes a tongue 10 incorporating a stop sensor 11, such as a telescoping joint, and a master cylinder 12 with a piston connected to the sensor 11. As is conventional, the master cylinder 12 includes an integral reservoir 12a and check valve 12b to control the flow of fluid therebetween. As is apparent, when the towing vehicle V slows due to braking, the momentum of the trailer T tends to urge the tongue 10 in the forward direction. A counteracting force, denoted by the action arrow A, causes the stop sensor 11 to operate the master cylinder 12 to provide operating pressure.

The pressurized hydraulic fluid from the master cylinder 12 moves through the common feed line 13, which is in turn connected to an inlet coupling 14 of a master disc brake assembly 15, incorporating the important new concepts of the present invention. A more detailed description of the disc brake assembly 15 follows below. An outlet coupling 16 is connected to a common return/exhaust line 17 directly to the reservoir 12a.

For a single axle trailer T with braking action to both wheels, a T coupling 18 is connected to the common feed line 13 providing a branch 13a, which in turn connects to an inlet coupling 20 on a slave or follower disc brake assembly 21. Thus, the branch line 13a is functionally a part of the common feed line 13. Of course, additional T couplings may be provided on the common feed line for feeding additional slave/follower brake assemblies (not shown) when tandem axles are utilized.

As in my previous design, only a single master disc brake assembly 15 is required in combination with a selected number of slave/follower disc brake assemblies 21. As before, a significant advantage is obtained by making the basic parts of the slave/follower disc brake assembly 21 interchangeable with the master disc brake assembly 15. As can be seen by viewing the similarity of the two assemblies in FIG. 1, the differences are, for example, that a single inlet/outlet coupling 20 is utilized and, as will be further apparent below, no relief valve is necessary and the mounting of the caliper units is different.

Proceeding now to FIG. 2, an exploded view of the preferred embodiment of the disc brake unit, including key components of the trailer T, is illustrated. The axle and the wheel spindle, as well as the typical roller bearings and necessary spacers, are omitted from illustration in FIG. 2. For these and other details, I am incorporating by reference to prior patents Nos. '110 and '120 and my pending 'No. 244 patent application. There is provided sufficient illustration of these basic components in these prior patents/application for understanding the manner in which the system works. It will be understood that a hub 25 is mounted on the spindle by roller bearings. Washer 26, castle nut 27 and cotter key 28 serve to lock the hub 25 on the threaded end of the spindle in a typical manner. Connected to the mounting studs 25a on the hub 25 is an offset rotary brake disc 29 that thus forms a portion of the brake unit to which the disc brake assembly 12 is applied.

A stationary mounting bracket 30 is positioned on the axle and mounted by suitable fasteners (also not shown). As should be appreciated, the bracket 30 contains an open end 31 for positioning over the axle without the need for removing the hub 25 and its various components. Bracket 30 also includes support tabs 32 and 33 for limiting the pivoting movement of the caliper unit, generally designated by reference numeral 40, as will be explained in more detail below. Also, leaf spring 34 provides a resilient means to bias the caliper unit 40 towards support tab 32 during forward movement of the trailer T.

A pivot pin, in the form of a shoulder bolt 36, extends through mated apertures in the caliper unit 40 and the mounting bracket 30. The bolt 36 is supported in a metal bushing (such as brass) for free pivoting movement. It is locked in place by a suitable lock washer and nut combination 38. Advantageously, the bolt 36 and the nut/washer 38 serve to form a limit means to substantially prevent in and out axial movement of the caliper unit 40 along the bolt 36.

The caliper unit 40 generally includes a housing assembly comprised of a first housing 42 and a second housing 43. With reference to first housing 42, a bore is provided for forming a first brake cylinder 44. The second housing 43 is similar thereto except for the absence of the release means as will be described in more detail below. Positioned in the cylinder 44 is a sealing O ring 45, a piston 46 and a dust seal/guide ring 47. The first housing 42 of the caliper unit 40 of the disc brake assembly 12 contains brake pad 48, including a backing plate 48a that is integrally formed therewith. The second housing 43 contains a second brake pad 50 and corresponding backing plate 50a. Suitable connecting bolts 51 (only one shown) are provided to connect the first housing 42 with the second housing 43. Furthermore, transverse pins 52 are provided for slidably carrying the backing plates 48a, 50a of corresponding brake pads 48, 50. The head of the transverse pins 52 along with pin clips 53 hold the pins in position, as well as allow for easy removal of the pins for replacement of the pads 48, 50.

As will be apparent in the non-braking mode, such as illustrated in FIG. 3A, the pads 48, 50 are slightly spaced from the offset brake rotor 29. However, once the hydraulic pressure is applied through the master cylinder 12 of the brake unit, as illustrated in FIG. 1, the opposed pistons 46, 46' shift the pads 48, 50 into engagement with opposite faces of the brake rotor 29. This provides for efficient braking through smooth operation of the pistons 46, 46' without the need for in and out axial movement to provide the self centering, as in my previous designs.

The caliper unit 40, as formed by the first housing 42 and second housing 43, operates in a unique manner for an opposed piston braking system. Specifically, the caliper unit 40 pivots on the bolt 36 during the backing, non-braking mode of operation. As is thus apparent, the pivoting action of the caliper unit 40 operates very reliably. There is no need for axial movement, thus eliminating any tendency for interference with the pivoting action that is provided to release the braking action during backing. In other words, a significant improvement feature of the present invention, in contrast to my previous basic approaches, is the manner in which the caliper unit is mounted to the mounting bracket 30 for pivoting movement, without the need for axial, in and out sliding movement of the caliper unit.

As described above, pressurized hydraulic fluid enters the master disc brake assembly 15 through inlet coupling 14. The fluid then travels into the first brake cylinder 44 which begins to fill with the fluid. Connecting passageways 54 are provided within the first housing 42 and second housing 43 of the caliper unit 40 for connecting the first brake cylinder 44 with the second brake cylinder 44' to allow the fluid to flow therebetween. The high pressure fluid which is now present in both cylinders 44, 44' causes the pistons 46, 46' to be simultaneously actuated with equal and opposite forces. The passageways 54 are preferably cast integrally within the housings 42, 43 and provide an effective means for delivering the high pressure fluid to both cylinders while eliminating any need for external feed lines on the caliper unit. Thus, the braking system is made more reliable for its intended use with trailers T wherein there always exists the possibility for objects used on or around the trailer to come into contact with external feed lines and cause damage.

With specific reference now to FIG. 5 of the drawings, a top view of the caliper unit 40 shows an opening 56, which extends through the caliper unit 40 and is equally contained within the first housing 42 and second housing 43. The brake pads 48, 50 are placed within the opening 56. As shown, the transverse pins span the opening 56 for slidably carrying the backing plates 48a, 50a of the pads 48, 50. It should be appreciated the transverse pins 52 are not for connecting the first and second housings 42, 43 which are held together by connecting bolts 51. Thus, the transverse pins 52 and pin clips 53 allow for the quick and easy installation/removal of the brake pads 48, 50 without the need for disassembling the entire caliper unit. Furthermore, the opening 56 permits for visual inspection of the brake pads 48, 50 in order to determine the amount of wear thereto.

The sliding motion of the backing plates 48a, 50a, and of course the pads 48, 50 as well, upon the transverse pins 52 allows for the pads to freely move into and out of engagement with the rotor in response to braking during forward movement. Similarly, the brake pads 48, 50 are freely allowed to release from engagement with the rotor 29 during the backing, non-braking mode. Clearly, it can be appreciated that the features of the present invention efficiently enable the self-centering needed for even wearing of the brake pads 48, 50. As should be further appreciated, the opening 56 also allows for rapid dissipation of heat generated during braking. By maintaining the brake pads 48, 50 at a lower operating temperature, the life expectancy is extended. Also, the reliability and performance of the braking system is increased due to the much better braking force provided by cooler braking pads 48, 50.

With specific reference now to FIG. 4 of the drawings, the disc brake assembly 15 is illustrated from the perspective of inside the rotor 29 and the wheel, or generally in the opposite direction from that shown in FIG. 2. The illustration in FIG. 4 is with the disc brake assembly 15 positioned when the trailer T is assumed to be in normal forward movement, and with the rotor 29 turning in the clockwise direction, in accordance with the action arrow C. It will be understood that the illustration in this figure is such that the position of the assembly 15 is the same in forward motion for either normal braking or non-braking.

The hydraulic fluid flows through the common feed line 13 extending from the master cylinder 12 through the coupling 14 and past a relief valve, generally designated by the reference numeral 70. A through passage chamber 71 connects to a common transfer line or passage 72 in the first housing 42. As illustrated, when the relief valve 70 is in the position shown in FIG. 4, the flow of pressurized fluid is thus provided to the first brake cylinder 44 and through passageways 54 to the second brake cylinder 44' so as to simultaneously actuate the pistons 46, 46' and resulting in braking action being applied by the brake pads 48, 50.

When the caliper unit 40 is in the position of FIG. 4 (forward movement), the caliper unit is held in engagement with the support tab 32 (see FIG. 2) of mounting bracket 30. Advantageously, leaf spring 34 provides the biasing action which maintains the contact between caliper unit 40 and support tab 32. The leaf spring 34 provides a simple and inexpensive means for keeping the caliper unit 40 firmly fixed against the support tab 32, and more specifically the mounting bracket 30. Thus, there is no unwanted periodic lifting off of the support tab 32 which could cause uneven braking.

The valve 70 also includes a valve body 75, threaded into a bore of the first housing 42 forming the chamber 71. A valve sleeve 75a, as shown in FIG. 4, mates with the bore. The two piece valve element 76, 76a is adapted for up and down motion in the sleeve to either allow passage of fluid directly through the chamber 71 and through the transfer ports of the sleeve 75a, or to divert and release the pressurized hydraulic fluid through the common return or exhaust line 17. At the top of the valve element 76a is a head 77 that engages a seat on the top of the sleeve 75a so as to be operative to provide the desired relief flow. As is apparent, the valve element 76, 76a is maintained in the downward or closed position by a spring 78 for normal forward movement of the trailer T, and in readiness for braking.

With reference to FIG. 4A, an actuator stop 90 is positioned on a mounting ear 91 of the bracket 30; the stop 90 being positioned in alignment for engagement with the valve element 76. In operation, as the trailer is backed by the vehicle V, it will be realized that the tongue 10 is forced back, activating the sensor 11 and actuating the master cylinder 12. As the brake pads 48, 50 engage the rotor 29, the frictional engagement starts to pivot the caliper unit 40 away from the support tab 32. This occurs since the backing provides counterclockwise rotation of the rotor 29, as designated by the action arrow D in FIG. 4A. As the pivoting of the caliper unit 40 continues, the biasing action provided by the leaf spring 34 is overcome and the pressure is relieved due to the contact present at this point between the valve element 76 and the actuator stop 90. Thus, both the master brake assembly 15 and the slave/follower brake assembly 21 are disengaged and the trailer T is backed easily.

The valve element 76, 76a is particularly adapted for proportioning the flow for maintaining the brake pads 48, 50 in light engagement with the rotor 29 so that the caliper unit 40 is maintained in the pivoted position about the bolt 36 until the backing is complete. Since the caliper unit 40 on the pivot bolt 36 is allowed to operate freely without the need for in and out axial movement, the pivoting action as represented in FIG. 4A is smooth and uninterrupted.

Once the backing is complete and the rotor 29 stops, the compressive force built up in the leaf spring 34 is sufficient to immediately return the caliper unit 40 to its position engaging the support tab 32. Once the trailer T then resumes forward motion with the disc 29 traveling in the direction C, the braking operates in a normal fashion.

When braking is initiated, with the caliper unit 40 so pivoted against the support tab 32, the pressurized hydraulic fluid generated in the master cylinder 12 travels in the direction of the flow arrows in FIG. 4. The pistons 46, 46' are simultaneously actuated due to the flow of the fluid through passageways 54. The pads 48, 50 are then firmly engaged with the disc 29 and braking is effective.

With reference to FIG. 1, it is shown that caliper unit 40 of the slave/follower disc brake assembly 21 are mounted to the mounting bracket 30 by the mounting pins 94. Thus, it should be appreciated that no pivoting movement is provided in the slave/follower assemblies 21. It should be appreciated that the pivoting action of the master disc brake assembly, as described above, also provides for the release of the brake pads of the slave/follower assembly 21 from firm braking engagement upon backing.

In summary, improvements are provided in several different respects by the brake system of the present invention. The compact caliper unit 40, incorporates dual hydraulically operated pistons 46, 46' to provide the braking action. The pivot mounting on the bolt 36 provides release of the brake pads 48, 50 from braking engagement upon backing in a particularly unique way. No longer is in and out axial movement of the caliper unit required, as in previous brake system designs. A more reliable, versatile and efficient braking system for trailers is provided. In addition, these improvement features are obtained while still maintaining the overall cost of manufacturing and maintenance very low.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A brake unit including a disc brake assembly having brake pads for mounting on an axle of a trailer or other towed vehicle for stopping during forward movement and to provide release of the brake pads from firm braking engagement with a rotor upon backing comprising:

a stationary mounting bracket for attachment to the vehicle for supporting the disc brake assembly;

hydraulic means for moving the pads into and out of engagement with the rotor in response to the presence and release of hydraulic pressure for forward braking and backing non-braking modes of vehicle operation, respectively;

a caliper unit including a housing assembly, said housing assembly having a first housing and a second housing with the brake pads mounted therebetween;

said hydraulic means including opposed first and second pistons in operative engagement with the brake pads to provide said engagement with said rotor, said first piston positioned within a first brake cylinder in said first housing and said second piston positioned within a second brake cylinder in said second housing;

pivot means for mounting said caliper unit on said bracket for only pivoting movement of said caliper unit in response to movement of said rotor upon backing; and means to release the firm braking engagement of the brake pads with said rotor in response to said pivoting movement for non-braking during backing, whereby said brake unit is effective to provide efficient braking during forward movement and automatic release upon backing.

2. The brake unit of claim 1, wherein is further provided actuating means for operating said release means.

3. The brake unit of claim 1, wherein said release means is a relief valve for the hydraulic pressure operable in response to said pivoting movement.

4. The brake unit of claim 1, wherein said pivot means for pivoting movement of said caliper unit comprises a single pin.

5. The brake unit of claim 1, wherein is further provided resilient means for biasing said caliper unit toward a forward position during said forward movement of said trailer or other towed vehicle.

6. The brake unit of claim 5, wherein said resilient means is a leaf spring for providing the biasing of said caliper unit.

7. The brake unit of claim 1, wherein said first housing includes an inlet port for receiving a fluid, said fluid providing the hydraulic pressure.

8. The brake unit of claim 7, wherein said first and second housings further include at least one passageway connecting said first and second brake cylinders, said passageway delivering said fluid so as to simultaneously actuate said opposed first and second pistons with equal and opposite forces.

9. The brake unit of claim 8, wherein said release means is contained within said first housing.

10. A braking system including at least one disc brake assembly as defined in claim 1, and in combination further comprising:

actuating means for operating said release means;

said hydraulic means including a pressure source and reservoir, a feed line and a return line to and from said cylinders, respectively, said release means being operable by pivoting of said caliper unit to allow flow through said return line to said reservoir for relieving the hydraulic pressure during vehicle backing.

11. The braking system of claim 10, wherein said vehicle includes at least two wheels, said brake assembly with said release means forming a master assembly for braking one wheel, a slave brake assembly for braking the second wheel, said hydraulic means including a common feed line for supplying hydraulic pressure to said cylinders of both assemblies, said release means being operative through a common exhaust line to relieve the hydraulic pressure to said cylinders of both assemblies.

12. The braking system of claim 11, wherein said release means is a relief valve, said relief valve comprising a valve chamber communicating with said feed and exhaust lines, and a reciprocal valve member sealed in said chamber to open and close said exhaust line, and a common transfer line exposed to operating pressure in said feed line at all times through said valve chamber and to said exhaust line when said valve is actuated during the backing non-braking mode.

13. The brake unit of claim 1, wherein said mounting bracket includes an open end for placing said bracket over the axle without need for removing a hub assembly of the vehicle.

14. A brake unit including a disc brake assembly having brake pads for mounting on an axle of a trailer or other towed vehicle for stopping during forward movement and to provide release of the brake pads from firm braking engagement with a rotor upon backing comprising:

a stationary mounting bracket for attachment to the vehicle for supporting the disc brake assembly;

hydraulic means for moving the pads into and out of engagement with the rotor in response to the presence and release of hydraulic pressure for forward braking and backing non-braking modes of vehicle operation, respectively;

a caliper unit including a housing assembly, said housing assembly having a first housing and a second housing with the brake pads mounted therebetween, said first and second housings connected by a plurality of connecting bolts;

said hydraulic means including opposed first and second pistons in operative engagement with the brake pads to provide said engagement with said rotor, said first piston positioned within a first brake cylinder in said first housing and said second piston positioned within a second brake cylinder in said second housing;

pivot means for mounting said caliper unit on said bracket for only pivoting movement of said caliper unit in response to movement of said rotor upon backing;

said caliper unit further including an opening in the top thereof with at least one transverse pin spanning said opening, and backing plates mounting said brake pads and slidably carried on said pin.

\* \* \* \* \*